United States Patent
Soffer et al.

(10) Patent No.: US 10,237,696 B2
(45) Date of Patent: Mar. 19, 2019

(54) LOCATION-BASED ASSISTANCE FOR PERSONAL PLANNING

(71) Applicant: Intel Corporation, Santa Clara, CA (US)

(72) Inventors: Ronen Aharon Soffer, Tel Aviv-Jaffa (IL); Amir Yessachar, Givat Shmuel (IL)

(73) Assignee: Intel Corporation, Santa Clara, CA (US)

( * ) Notice: Subject to any disclaimer, the term of this patent is extended or adjusted under 35 U.S.C. 154(b) by 674 days.

(21) Appl. No.: 14/387,607

(22) PCT Filed: Mar. 14, 2013

(86) PCT No.: PCT/IB2013/052016
§ 371 (c)(1),
(2) Date: Sep. 24, 2014

(87) PCT Pub. No.: WO2013/144759
PCT Pub. Date: Oct. 3, 2013

(65) Prior Publication Data
US 2015/0045068 A1 Feb. 12, 2015

Related U.S. Application Data

(60) Provisional application No. 61/617,075, filed on Mar. 29, 2012, provisional application No. 61/649,938, (Continued)

(51) Int. Cl.
G01C 21/20 (2006.01)
H04W 4/02 (2018.01)

(52) U.S. Cl.
CPC .......... *H04W 4/025* (2013.01); *G01C 21/20* (2013.01)

(58) Field of Classification Search
CPC ....... H04W 4/02; H04W 4/021; H04W 4/025; H04W 4/023; H04W 4/028; H04L 67/18
(Continued)

(56) References Cited

U.S. PATENT DOCUMENTS 7,873,372 B2 * 1/2011 Creemer .............. G06Q 30/02
342/357.34
8,533,266 B2 * 9/2013 Koulomzin ........... G06Q 50/01
709/203

(Continued)

FOREIGN PATENT DOCUMENTS

WO 2010125499 11/2010

OTHER PUBLICATIONS

International Searching Authority, "Notification of Transmittal of the International Search Report and the Written Opinion of the International Searching Authority," dated Oct. 9, 2014, in International application No. PCT/IB2013/052016.

*Primary Examiner* — Julio R Perez
(74) *Attorney, Agent, or Firm* — Trop, Pruner & Hu, P.C.

(57) ABSTRACT

A method for location-based assistance includes maintaining in a personal digital assistant (PDA) (22, 24, 26) a data structure that is indicative of a state of a user (32, 34, 36) of the PDA. Responsively to the state, a map (30) is generated in the PDA indicating targets (42, 44, 46, 48) within an area of relevance surround a present location of the user. Based on the map, the PDA provides a suggestion to the user of an action to be taken by the user with respect to one or more of the targets.

10 Claims, 7 Drawing Sheets

Related U.S. Application Data filed on May 22, 2012, provisional application No. 61/656,028, filed on Jun. 6, 2012, provisional application No. 61/675,834, filed on Jul. 26, 2012.

(58) Field of Classification Search
USPC .................................... 455/456.1, 457, 458
See application file for complete search history.

(56) References Cited

U.S. PATENT DOCUMENTS

| | | | |
|---|---|---|---|
| 2006/0089792 A1* | 4/2006 | Manber | G01C 21/3644 |
| | | | 701/408 |
| 2006/0155465 A1 | 7/2006 | Jung et al. | |
| 2008/0098313 A1* | 4/2008 | Pollack | G06F 3/048 |
| | | | 715/753 |
| 2008/0248815 A1 | 10/2008 | Busch | |
| 2010/0088143 A1* | 4/2010 | Platt | G06Q 10/06311 |
| | | | 705/7.18 |
| 2010/0306824 A1* | 12/2010 | Gurney | G06F 21/6245 |
| | | | 726/4 |
| 2012/0246679 A1* | 9/2012 | Chen | H04N 21/4788 |
| | | | 725/38 |

* cited by examiner

LOCATION-BASED ASSISTANCE FOR PERSONAL PLANNING

CROSS-REFERENCE TO RELATED APPLICATION

This application is a national stage application under 35 U.S.C. § 371 of PCT/IB2013/052016, filed Mar. 14, 2013.

CROSS-REFERENCE TO RELATED APPLICATIONS

This application is a National Phase application claiming priority to International Application No. PCT/IB2013/052016, filed Mar. 14, 2013, which claims priority to U.S. Provisional Patent Application Ser. No. 61/617,075, filed Mar. 29, 2012, U.S. Provisional Patent Application Ser. No. 61/649,938, filed May 22, 2012, U.S. Provisional Patent Application Ser. No. 61/656,028, filed Jun. 6, 2012, and U.S. Provisional Patent Application Ser. No. 61/675,834, filed Jul. 26, 2012, the content of which is hereby incorporated by reference.

FIELD OF THE INVENTION

The present invention relates generally to mobile computing and communication devices, and specifically to personal digital assistants.

BACKGROUND

Siri™ (Speech Interpretation and Recognition Interface) is an intelligent personal assistant and knowledge navigator application program that runs on the Apple™ iPhone™ 4S. According to Wikipedia™, Siri uses a natural language user interface to answer questions, make recommendations, and perform actions by delegating requests to a set of Web services. Siri performs tasks such as finding recommendations for nearby restaurants and getting directions. Apple claims that the software adapts to the user's individual preferences over time and personalizes results.

SUMMARY

Embodiments of the present invention provide methods, apparatus and software that can actively assist a user in making location- and time-related decisions.

There is therefore provided, in accordance with an embodiment of the present invention, a method for location-based assistance, which includes maintaining in a personal digital assistant (PDA) a data structure that is indicative of a state of a user of the PDA. Responsively to the state, a map is generated in the PDA indicating targets within an area of relevance surround a present location of the user. Based on the map, a suggestion is provided from the PDA to the user of an action to be taken by the user with respect to one or more of the targets.

In some embodiments, maintaining the data structure includes detecting the present location of the user, and categorizing the detected location. Maintaining the data structure may include assessing, responsively to a category of the detected location, a geo-cognitive distance between the user and the detected location.

Additionally or alternatively, maintaining the data structure includes automatically detecting a state of motion of the user. Detecting the state of motion may include identifying a means of transport by which the user is traveling. In one embodiment, detecting the state of motion includes identifying an intended destination of the user and an estimated time of arrival at the intended destination, and providing the suggestion includes suggesting, responsively to the state of motion and the estimated time of arrival, a diversion to one of the targets en route to the intended destination. Further additionally or alternatively, generating the map includes adjusting a dimension of the map relative to the state of motion.

In some embodiments, maintaining the data structure includes automatically learning a temporal routine of the user, and evaluating the state of the user with respect to the routine. Maintaining the data structure may include analyzing a behavior of the user relative to the temporal routine in order to assess a state of mind of the user, wherein providing the suggestion includes choosing the suggestion to be provided responsively to the state of mind.

Additionally or alternatively, maintaining the data structure includes analyzing user responses to suggestions provided by the PDA in order to derive user preferences, and providing the suggestion includes applying the preferences together with the state of the user in generating the suggestion.

Generating the map may also include indicating on the map an item to be avoided by the user.

In a disclosed embodiment, at least one of the targets includes a person having a mobile device, and providing the suggestion includes carrying out an autonomous communication between the PDA and the mobile device in order to coordinate the action with the person.

There is also provided, in accordance with an embodiment of the present invention, a method for motion-based assistance, which includes collecting in a personal digital assistant (PDA) inputs with respect to motion of a user of the PDA. Responsively to the inputs, a motion-related state of the user is assessed in the PDA. Based on the motion-related state, a suggestion is provided from the PDA to the user of an action to be taken by the user.

In some embodiments, assessing the motion-related state includes identifying a means of transport by which the user is traveling. Identifying the means of transport may include distinguishing whether the user is traveling in a private vehicle or on public transport. In one embodiment, providing the suggestion includes automatically recommending to the user an alternative means of transport.

Additionally or alternatively, assessing the motion-related state includes identifying an intended destination of the user and an estimated time of arrival at the intended destination, and providing the suggestion includes suggesting, responsively to the state and the estimated time of arrival, a stop en route to the intended destination.

In some embodiments, providing the suggestion includes carrying out an autonomous communication between the PDA and a mobile device of a person that the user is to meet, and coordinating travel between the user and the person. Coordinating the travel may include suggesting to the user a change in a travel plan responsively to an expected time of arrival of the person at a common destination. Additionally or alternatively, coordinating the travel includes arranging, by means of the autonomous communication, for the person to pick up the user en route to a common destination.

In one embodiment, the method includes receiving in the PDA from the user a name associated with a place to which the user is planning to travel, and resolving a location of the place to be associated with the name responsively to the motion of the user.

There is additionally provided, in accordance with an embodiment of the present invention, a method for communication-based assistance, which includes receiving in a first personal digital assistant (PDA), operated by a first user, an indication of an event to be scheduled, in which a second user is to participate. Responsively to the indication, a request is autonomously generated in the first PDA in accordance with a predefined inter-PDA protocol for transmission to a second PDA operated by the second user. Upon receiving a response from the second PDA, in accordance with the predefined inter-PDA protocol, the event is automatically entered in a schedule of the first user maintained by the first PDA.

In some embodiments, entering the event includes applying a predefined policy so as to decide whether to confirm or decline participation in the event. In one embodiment, applying the predefined policy includes resolving, based on the policy, a time conflict between the event and another event in which the participation of the first user is requested. Resolving the time conflict may include computing a respective commitment intensity of the user to each of the events, and autonomously choosing the event in which to participate responsively to the commitment intensity. Typically, computing the respective commitment intensity includes applying a type of analysis selected from a group of analysis types consisting of relationship analysis between the user and other participants, semantic analysis of data associated with the events, and contextual analysis of the event.

In some embodiments, entering the event in the schedule includes coordinating travel between the first and second users. In one embodiment, generating the request includes querying the second PDA with respect to an estimated time of arrival of the second user at a predefined destination, the response includes the estimated time of arrival, and coordinating the travel includes suggesting to the first user a change in a travel plan responsively to the estimated time of arrival. Alternatively, generating the request includes asking the second user to pick up and transport the first user to a destination, and coordinating the travel includes causing the second PDA to navigate the second user to a location at which the first user is to be picked up responsively to the request.

Typically, the request causes the event to be automatically entered by the second PDA in the schedule of the second user. Generating the request may include, after scheduling the event, autonomously asking the second PDA to change at least one of a time and a venue of the event.

In a disclosed embodiment, generating the request includes transmitting requests to both the second PDA and to at least a third PDA operated by a third user so as to autonomously schedule the event at a time and location in which at least the first, second and third users will be able to participate.

There is further provided, in accordance with an embodiment of the present invention, apparatus for location-based assistance, including a memory, configured to hold a data structure that is indicative of a state of a user of the apparatus and a user interface, including a display. A processor is configured to maintain the data structure and responsively to the state, to generate a map indicating targets within an area of relevance surround a present location of the user, and to provide, based on the map, via the user interface, a suggestion to the user of an action to be taken by the user with respect to one or more of the targets.

There is moreover provided, in accordance with an embodiment of the present invention, apparatus for motion-based assistance, including a memory, a user interface, and one or more sensors. A processor is configured to collect inputs from the one or more sensors with respect to motion of a user of the apparatus, and to assess, responsively to the inputs, a motion-related state of the user, and to provide, based on the motion-related state, via the user interface to the user a suggestion of an action to be taken by the user.

There is furthermore provided, in accordance with an embodiment of the present invention, apparatus for communication-based assistance, including a memory, a user interface, and a communication interface. A processor is configured to receive from a first user, via the user interface, an indication of an event to be scheduled, in which a second user is to participate, and responsively to the indication, to autonomously transmit a request via the communication interface to a PDA operated by the second user in accordance with a predefined inter-PDA protocol, and upon receiving a response from the PDA, in accordance with the predefined inter-PDA protocol, to automatically enter the event in a schedule of the first user maintained in the memory.

There is also provided, in accordance with an embodiment of the present invention, a computer software product, including a non-transitory computer-readable medium in which program instructions are stored, which instructions, when read by a computer, cause the computer to hold a data structure that is indicative of a state of a user of the computer and responsively to the state, to generate a map indicating targets within an area of relevance surround a present location of the user, and to provide, based on the map, via a user interface, a suggestion to the user of an action to be taken by the user with respect to one or more of the targets.

There is additionally provided, in accordance with an embodiment of the present invention, a computer software product, including a non-transitory computer-readable medium in which program instructions are stored, which instructions, when read by a computer, cause the computer to collect inputs with respect to motion of a user of the computer, and to assess, responsively to the inputs, a motion-related state of the user, and to provide, based on the motion-related state, via a user interface to the user a suggestion of an action to be taken by the user.

There is further provided, in accordance with an embodiment of the present invention, a computer software product, including a non-transitory computer-readable medium in which program instructions are stored, which instructions, when read by a computer, cause the computer to receive from a first user an indication of an event to be scheduled, in which a second user is to participate, and responsively to the indication, to autonomously transmit a request via the communication interface to a PDA operated by the second user in accordance with a predefined inter-PDA protocol, and upon receiving a response from the PDA, in accordance with the predefined inter-PDA protocol, to automatically enter the event in a schedule of the first user maintained by the computer.

The present invention will be more fully understood from the following detailed description of the embodiments thereof, taken together with the drawings in which:

DETAILED DESCRIPTION OF EMBODIMENTS

Overview

Figure 1:
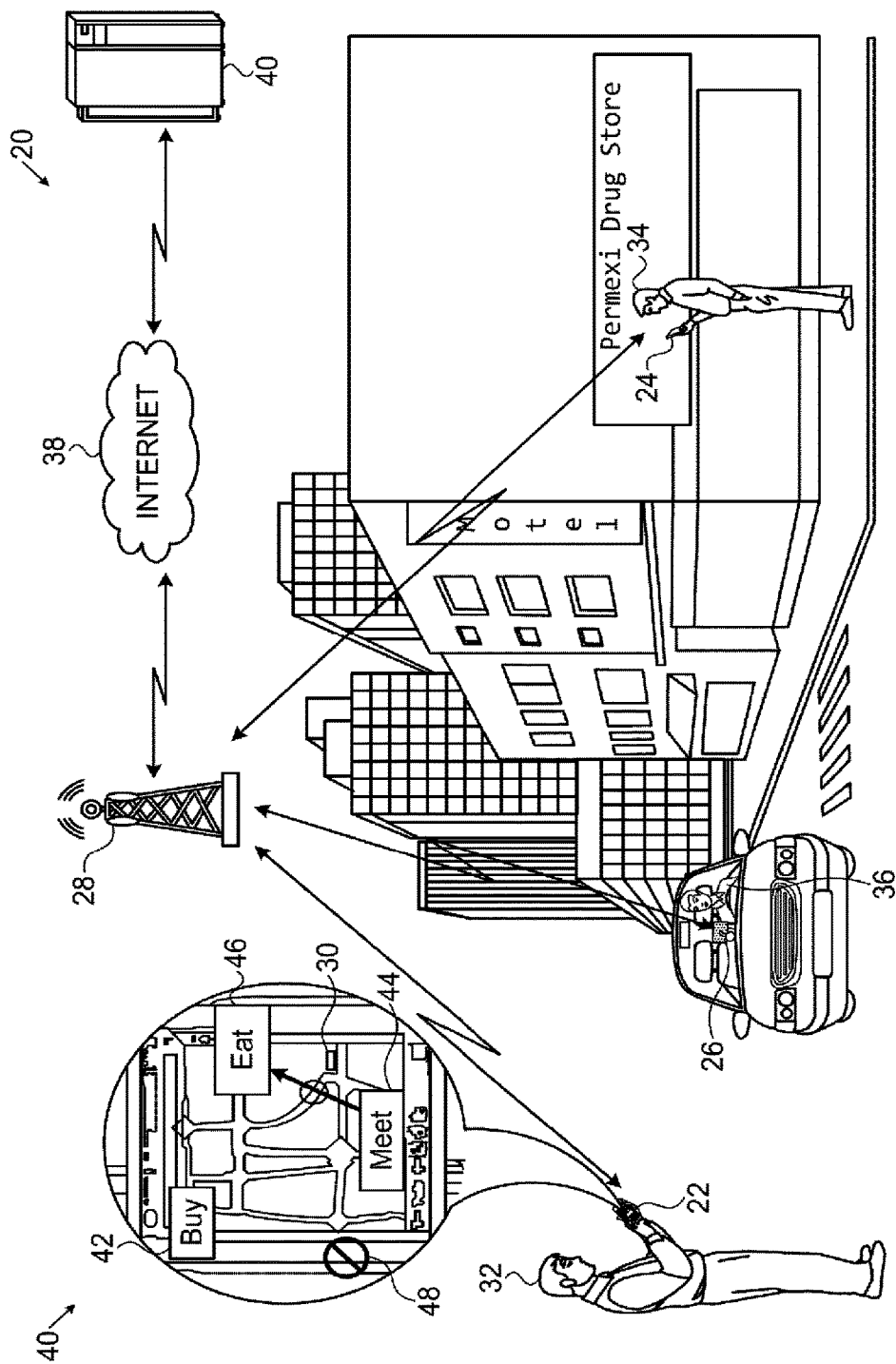
FIG. 1 is a schematic, pictorial illustration of a system for personal planning, in accordance with an embodiment of the present invention.

People in modern societies often have tight schedules and multiple obligations—sometimes conflicting with one another—that they have to satisfy. In many cases, schedules have to be coordinated among multiple individuals. People spend large amounts of time and effort in getting from place to place, and factors beyond their control, such as traffic, public transportation delays, or meetings that run late, frequently tend to disrupt even the best-made plans.

Schedule planning, maintenance and updates in this sort of environment can consume substantial time and attention, particularly when schedules change due to unforeseen circumstances. Personal digital assistants (PDAs), such as smart phones, can help users keep track of their schedules, but they do little to relieve the communication and attention burden involved in schedule planning and coordination. Users must generally rely on manual tracking of tasks and their own intuition and memory in attempting to optimize their use of available time.

Embodiments of the present invention provide an intelligent personal assistant that not only responds to user requests, but also anticipates user needs and actively assists in optimizing time and space planning and decision-making. The terms "assistant" and "PDA," as used herein, refer to a portable computing device with suitable interfaces and software for carrying out the functions described herein. This assistant continually constructs and updates a data structure representing the user's cognitive and contextual state, which reflects both the user's needs, preferences, and time constraints and the user's physical location and environment, including situational and dynamic elements. In some embodiments, the intelligent personal assistant analyzes the user's motion and takes motion into account in evaluating the user's state.

This state information enables the assistant to identify a set of "targets," comprising physical elements (such as people and places) in proximity to the user at any given time that the user may wish to pursue or, alternatively, to avoid. On the basis of the user state, the assistant provides recommendations, notifications and alerts, which serve as decision-support information to the user when facing motion-related tasks (such as where to go, when to leave, how to get there, who to invite or notify, and potential benefits or risks en route), and thus automatically assists users in coordinating daily plans, travel and arrival schedules.

The assistant not only responds to user requests, but also predicts and proposes ways in which the user can most effectively use available time, given the user's personal information, preferences and habits, present location, intent, direction of travel, and other constraints. In this manner, the assistant helps the user stay on schedule and use available time and transport resources efficiently. By the same token, the assistant supports and guides the user in dealing effectively with schedule changes, including coordination of schedules with other users.

In some embodiments, the intelligent personal assistant autonomously communicates with other, similar devices, in order to actively assist the user in time and space planning and decision-making. The assistant uses a predefined protocol, which enables it to frame structured queries and responses to other devices, with semantics that express complex constructs in a compact, unambiguous manner. The protocol enables assistants to share information regarding the cognitive and contextual state of the respective users (such as their current locations, activities, time constraints and plans), and thus to schedule shared activities with minimal user involvement. The assistants are likewise able to autonomously notify one another and adapt to changes in schedules. A graphical user interface enables users to interact in a simple, intuitive manner with these scheduling and communication functions of the assistant.

The intelligent personal assistant controls these communication and scheduling functions on the basis of policies that it maintains and progressively refines. Basic policies may be set in advance by the user, such as which items of user state information can be shared in response to queries from other devices, and what priorities should be attached to specific events or types of events for the purpose of resolving scheduling conflicts. These policies may have different values with respect to different peers with which the assistant interacts, so that for example, information is more freely shared with family members than with business acquaintances. When a query or request to schedule an event falls outside the bounds of existing policies, the assistant may ask the user for instructions. The assistant may also refine and update policies and may make decisions autonomously based on semantic and behavioral analysis.

In some embodiments, the assistant also uses the user's state, as well as personal, social and local feeds, sensor information, and other forms of available data, in order to calculate and determine the user's "state of mind." Aspects of this state of mind may include, for example, the user's level of openness and interest as opposed to stress and distress. The assistant then uses this state-of-mind information in making decisions and recommendations to the user, including deciding whether or not to recommend anything at all at a given time, as well as what to recommend or offer.

As an example, if a user is late to a business meeting, stuck in a traffic jam in an area with severe weather conditions, and makes multiple phone calls, the assistant may hold off on any "benefit" recommendations and will focus only on valuable mitigation offers for this situation, such as alternative itineraries. The assistant may also autonomously communicate with the relevant entities, such as a meeting organizer, the restaurant in which a table was booked, or the parent of a child sharing an activity with the user's child when late for picking her up. On the other hand, if the user is about to be 30 minutes early to a friendly meeting in an area he knows well, the assistant could trigger either a recommendation to stop for gas on the way (potentially saving both time and money by optimizing geo-spatial and price considerations) or offer an opportunity to carry out a pending errand, which can be conveniently addressed in the vicinity.

The assistant may collect state information and analyze it using a learning algorithm for the purpose of identifying behavioral trends and patterns relating to the user's motion and mobility activity. The algorithm may relate to factors such as places, areas, times, people, categories, situational identifiers, means of transport, communication and other actions and choices. The assistant uses this analysis to better incorporate the user's habits and preferences into the personal assistance functionality described above. In this manner, the assistant may continually learn and improve the relevance and value of recommendations, notifications and alerts provided.

The functions of the personal digital assistant that are described in this patent application may typically be implemented in software on existing portable devices, such as smart phones, portable computers, and other types of digital assistants that are known in the art. The disclosed embodiments typically take advantage of sensors (such as a GPS receiver and/or accelerometer), communication and user interfaces, and computing capabilities that are built into such devices.

System Description

FIG. 1 schematically illustrates a system 20 for personal planning, in accordance with an embodiment of the present invention. Users 32, 34, 36 carry respective personal digital assistants (PDAs) 22, 24, 26. (The description that follows relates specifically, for convenience and clarity, to user 32 and PDA 22, but may equally apply to the other users and PDAs.) PDAs 22, 24, 26 communicate via a wireless network 28, such as a cellular network or wireless LAN. These communication links enable the PDAs to access a server 40 via a data network 38, such as the Internet. The PDAs may comprise smart phones or any other suitable type of mobile computing device having a suitable user interface, communication interface, and location-finding capabilities (such as GPS). Server 40 provides various sorts of location-based information, such as maps, weather, available retail establishments, services and special offers, transportation and traffic, and locations of members of the user's social network. (This information is typically provided by suitable feeds from other servers, which are shown in FIG. 2.)

Based on information that PDA 22 receives from and about user 32 and on information received from server 40 and possibly other PDAs 24, 26, PDA 22 builds a schematic map 30, which may be viewed by the user on the PDA display. This map collates location-based information to identify and locate targets 42, 44, 46, 48 within a given radius of the user. The radius may be defined in terms of space and/or time, i.e., time needed to reach a given target, which will typically vary depending on the user's mode of transport and local conditions (such as congestion and availability of transport). A "target" may be a desired object, such as a meeting the user is supposed to attend, a commercial establishment, or a point of interest; or it may be an item to avoid (exemplified by target 48 in map 30), such as a traffic jam or a person to whom the user is known to be hostile. A target location may vary over time, as the object in question moves, and may have temporal limits, as well. Based on the map and the user's state and intent as identified by PDA 22, the PDA makes recommendations to the user relating to effective utilization of motion, time and space, which may include the most relevant action, communication, place, people, event/activity, means of transport, timing and schedules, bookings, etc.

Figure 2:
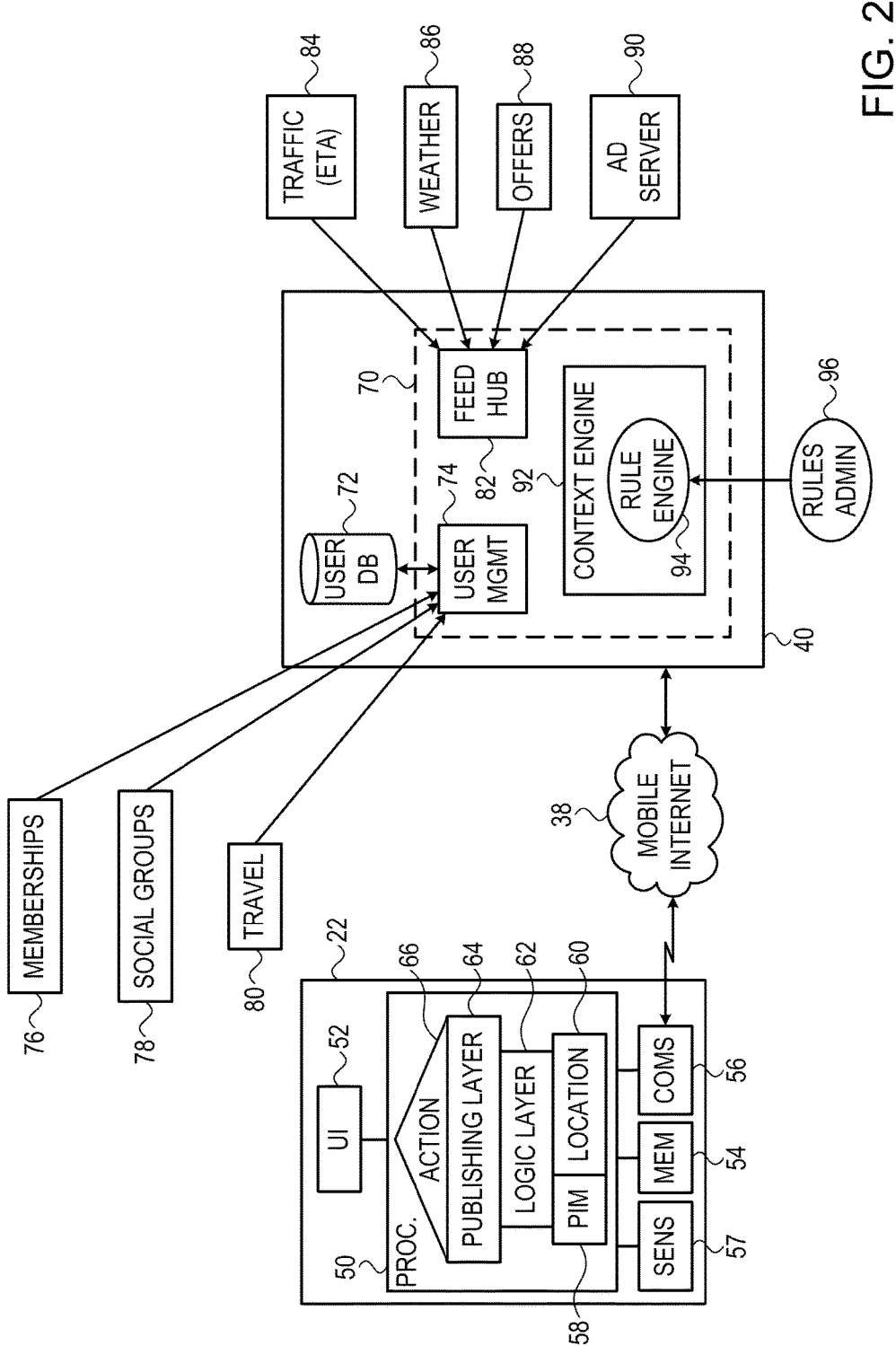
FIG. 2 is a block diagram that schematically illustrates functional elements of a system for personal planning, in accordance with an embodiment of the present invention.

FIG. 2 is a block diagram that schematically illustrates functional elements of system 20, including PDA 22 and server 40, in accordance with an embodiment of the present invention. In terms of hardware components, PDA 22 comprises a processor 50, with a suitable user interface (UI) 52, memory 54, communication interfaces 56, and sensors 57 (such as position and motion sensors), as are known in the art. User interface 52 comprises a display screen, user controls (possibly including a touch screen interface), and audio input and output devices. Server 40 is typically a general-purpose computer, comprising a processor 70 with a memory 72 and suitable interfaces, as is known in the art. Processors 50 and 70 typically run under the control of software program instructions. The applicable software may be downloaded to PDA 22 and server 40 in electronic form, over a network, for example. Alternatively or additionally, the software may be stored on tangible, non-transitory computer-readable media, such as optical, magnetic, or electronic memory. Processors 50 and 70 may comprise any suitable sort of computational hardware that is known in the art, and may optionally be supplemented by dedicated or programmable hardware, as well as peripheral components, for carrying out at least some of the functions that are described herein.

In terms of software components in PDA 22, a personal information manager (PIM) 58 may be based on standard PIM software provided with most PDAs, and maintains the user's calendar, contact lists, messaging, tasks and so forth. A location manager 60 tracks the user's location, as provided by sensors 57 and other inputs, and may also maintain related information, such as direction and speed of travel. A logic layer 62 combines PIM and location information with inputs from other sources, including UI 52 and server 40, in order to compute and update the state of user 32, as explained further hereinbelow. A publishing layer 64 applies the user's state, along with inputs from server 40 and possibly other PDAs 24, 26, . . . , in generating alerts, notifications and recommendations for user 32. The publishing layer also communicates with the server, other PDAs, and other entities via network 38 in order to exchange messages and implement the user's chosen schedule. An action layer 66 passes information from the publishing layer to user 32 via UI 52 and receives user responses.

Server 40 maintains a user database in memory 72, containing information gathered by a user management component 74 from publishing layers 64 of PDAs 22, 24, 26, . . . , regarding user schedules, states and preference. Additional user information may be collected from ancillary sources to which users 32, 34, 36, . . . , agree to provide access. These sources may include memberships 76 (such as credit cards, loyalty schemes and/or other account information used for payments and purchases), social groups 78 (such as social network links), and travel planners 80. Based on information provided by user PDAs and by these various sources, user management component 74 may derive and store information regarding the daily routines, locations, preferences and personal history of the users for use in planning and coordination, and updates this information in real time as user states change.

A feed hub 82 in server 40 communicates with external content, commerce and recommendation sources, in parallel with the user coordination functions of user management component 74. The sources tapped by feed hub 82 may include, for example, traffic information 84, for use in recommending modes of transport and computing routes and estimated times of arrival (ETA). Other sources may include weather information 86 and commercial offers 88 (particularly location-based offers, to coordinate with user location). Advertisement servers 90 may push advertisements to PDAs 22, 24, 26, . . . , depending on the state of the respective users (and subject to user consent).

A context engine 92 in server 40 decides what alerts, notifications and recommendations will be provided to each PDA, depending on the state of the user. To make the decision, the context engine applies user-specific rules to the various information inputs that are outlined above. These rules may be provided, at least in part, by a rules administrator 96 to a rule engine component 94 of the context engine, and they may be updated manually or automatically by the server based on accumulated experience.

Additionally or alternatively, the above types of user information may be derived, processed and stored by logic layer 62 in the user PDAs, either autonomously or in coordination with server 40. More generally, functions attributed in FIG. 2 and in the description above to server 40 may be carried out locally by PDA 22, and vice versa. In particular, assuming PDAs 22, 24, 26, . . . , have sufficient communication and computing resources, it may be preferable for at least some of the functions attributed above to server 40 to be implemented within and among the PDAs themselves. Thus, although the arrangement of software components described above has been found to be useful and effective in implementing the functionality that is described herein, other arrangements will be apparent to those skilled in the art and are considered to be within the scope of the present invention.

Computation and Maintenance of User State and Targets

The "targets" of relevance to user 32 at any given time and in any given place will vary depending on the cognitive and contextual state of the user. This state may be represented by a vector of values, which PDA 22 computes, maintains, and updates continually. Typically, for reasons of privacy, the user state vector may be held in the memory of the PDA, and only those fields that the user is prepared to share are passed to servers or published on the network.

Possible elements of the user state vector are listed in the table below:

TABLE I

| USER STATE VECTOR |
|---|
| Scheduling factors: |
| Time of next meeting<br>Distance to meeting<br>Early/late/on time |
| Current activity: |
| Business/leisure<br>Active/stationary |
| Motion-related factors: |
| Travel direction<br>Travel speed<br>Mode of transportation |
| Environmental factors: |
| Weather (present and forecast)<br>Points of congestion |
| State of mind: |
| Routine activity for present time of day and location<br>User on/off routine<br>Presence/absence of environmental and personal stress factors<br>Audio/voice analysis<br>Analysis of social network status posts and messages |

TABLE I-continued

| USER STATE VECTOR |
|---|
| Preferences: |
| Analysis of past user behavior to score user response to specific people, places and activities<br>Tasks that need to be performed, as entered by the user or learned by the PDA |

Figure 5:
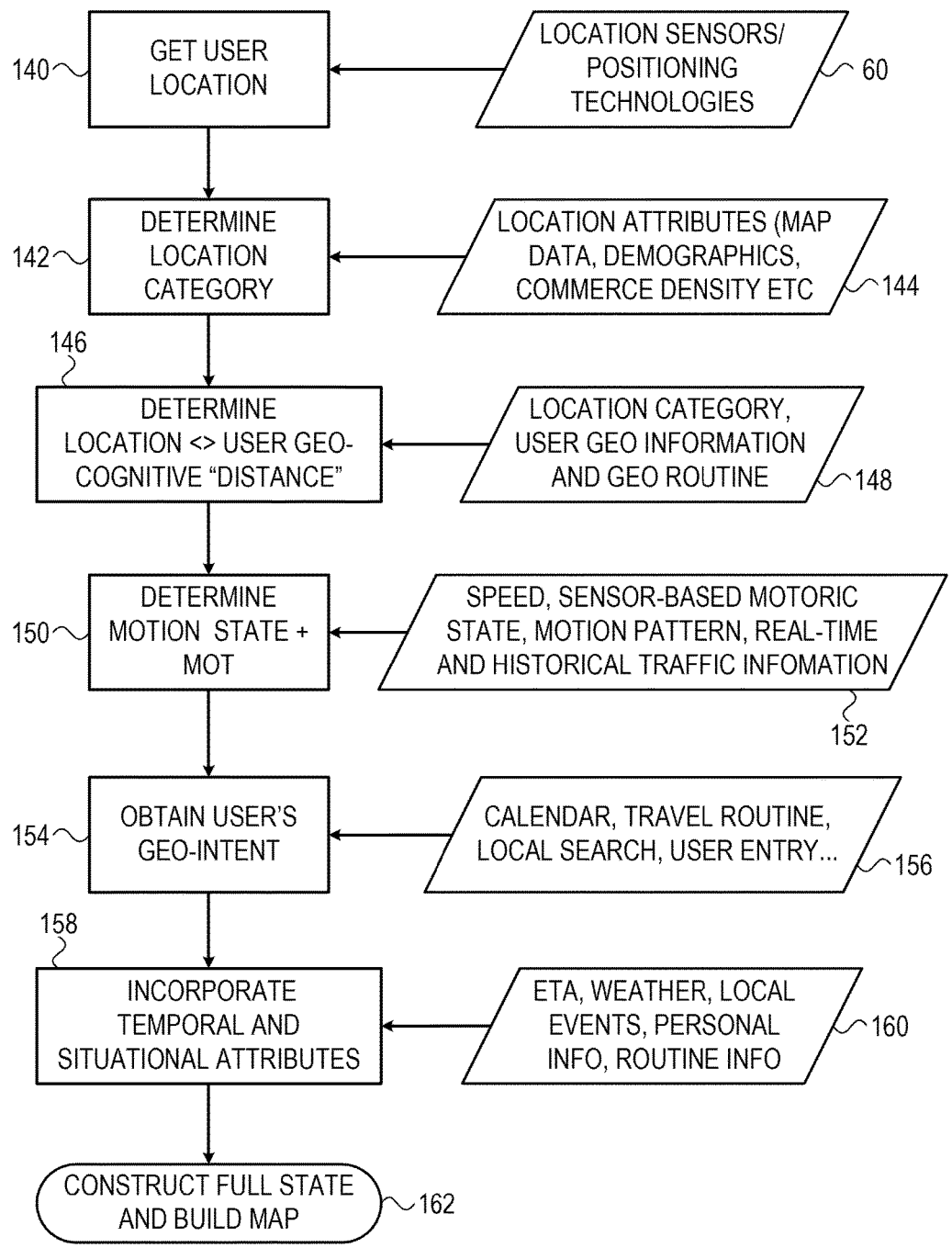
FIG. 5 is a flow chart that schematically illustrates a method for constructing a user's state vector, in accordance with an embodiment of the present invention.

As the table above shows, PDA 22 learns the daily and weekly schedule and routine of user 32 by analyzing actual user activities. The PDA also rates people, places and activities based on past user response. For example, if the user repeatedly declines to meet a given social acquaintance or business contact, the PDA may identify the person in question as a "target" to be avoided. Similarly, the PDA may recognize that the user frequents book stores at any opportunity while consistently avoiding certain chains of fast-food restaurants. All of these factors may be represented by corresponding values in the user state vector. A detailed method for state vector construction is shown in FIG. 5 below.

Figure 3:
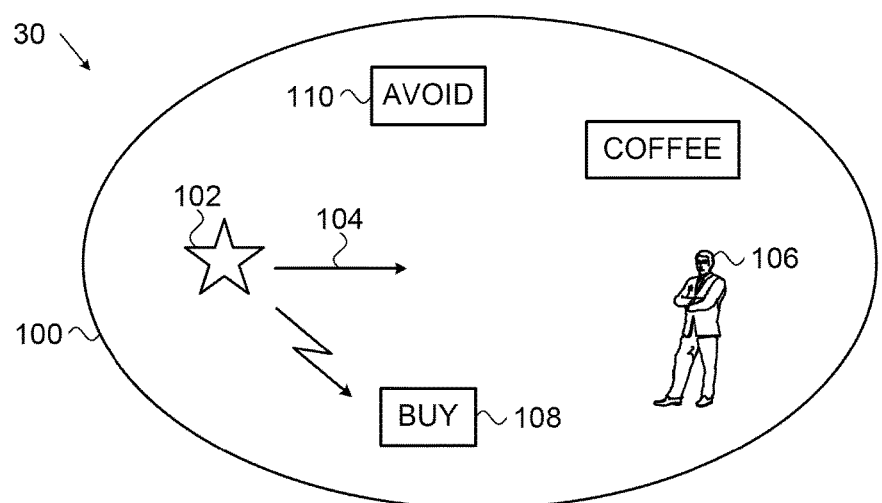
FIG. 3 is a schematic representation of a map of targets that is generated by a PDA, in accordance with an embodiment of the present invention.

FIG. 3 is a schematic representation of map 30 that is generated by PDA 22, showing targets displayed by the PDA in accordance with an embodiment of the present invention. The map is based on locations of objects (such as people, places and events) that are provided by server 40, together with state information stored by the PDA in the user's state vector. The PDA considers objects of possible relevance that are within a given area of relevance 100 surrounding the user's current location, which is marked by a star 102 in the figure. An arrow 104 marks the user's direction of motion.

In one implementation, area 100 is simply a circle of a given radius around the user's location. Alternatively, the area may have a different shape and may be affected by the user's direction and speed of motion. Thus, in the pictured example, area 100 is elongated in the direction of motion. The size of the area of relevance may be determined in geographical terms, by physical distance from the user's location, or in temporal terms, based on the estimated travel time from the user's current location to the locations of objects of interest in different directions. Furthermore, the size and shape of the area may change depending on the user's state. For example, the area may shrink when the user is rushed and expand when the user has time to spare.

To identify targets, PDA 22 applies a set of rules to each object within the area of relevance based on the user's current state vector. For example, each object may be represented by a vector of identifying characteristics, the rules may be represented by matrices, and each object may be scored by a linear algebraic operation between the user state vector, the object vector, and the relevant rule matrix. Alternatively or additionally, nonlinear methods of scoring and decision-making may be used. The identified targets may include, as noted above, objects to be aware of and possibly avoided (such as the object marked by a symbol 110 in FIG. 3), as well as suggested targets that may not have been on the user's conscious, planned itinerary.

In the example shown in FIG. 3, the user is on the way to a meeting with a contact person, whose location is marked by a symbol 106 at the right of the figure. The PDA computes the user's expected time of arrival at the meeting location, based on the user's current mode of transportation and speed of motion, on the distance to the destination, and on any expected delays along the way. PDA 22 has learned from past behavior of the user that at the present time of day, the user often stops for coffee in a preferred chain of coffee shops. Upon locating such a coffee shop within the area of relevance, the PDA may suggest to the user to invite the contact person to meet at the coffee shop, and may then send a meeting invitation if the user accepts the suggestion.

Based on the expected time of arrival, PDA 22 may determine that the user will be early for the planned meeting. In this case, the PDA may suggest uses for the spare time, based on the targets in the area of relevance. For example, at an earlier time, the user may have instructed the PDA to make a shopping list of items needed at home, and the PDA may identify a store, marked by a symbol 108, not far off the user's route where the user can buy the items on the list. As another example, the PDA may have determined that the user is interested in a particular author, and may identify a book shop along the user's route that is advertising the author's new book for sale. In such cases, the PDA may suggest that the user make a detour to buy the desired item. The PDA may at the same time retrieve and offer discount coupons for use in the target establishment.

In other cases, PDAs belonging to two users may negotiate between them a suitable place to meet based on availability (free time), location, means of travel available to each user—together with any limitations or disabilities, and data relating to the relationship between the users wanting to meet in terms of behavioral history, hierarchy (motivation to meet), etc.

Although the map shown in FIG. 3 is built on a certain fixed geographical infrastructure, which will be common to many different users and PDAs, PDA 22 personalizes the map and the targets that it presents based on the user's state and location and on the current time. Thus, different users will see different maps, and even for the same user, the map will change over time. At different times of day, while the user is engaged in different activities and has different scheduling constraints, a map of the same area may show different targets. The targets themselves—such as people that the user is planning to meet or would like to meet or to avoid—may also move on the map, allowing the user, with the assistance of the PDA, to make and change plans accordingly. As the map changes, the PDA reevaluates the targets and proposes appropriate actions that the user may take in response.

Coordination of User Travel

As explained above, PDA 22 uses map 30 to collate the user's schedule with location-based information, and may also track and predict the user's motion and activities over the near term (for example, over the present day or over a given time window of hours or even minutes). The user may interact with objects in this map using a predefined set of gestures and voice commands, which may invoke querying, moving, rescheduling, or sharing activities that are indicated on the display. Based on the map and the user's state and intent as identified by the PDA, the PDA makes recommendations to the user relating to effective utilization of motion, time and space, which may include the most relevant action, communication, place, people, event/activity, means of transport, timing and schedules, bookings, etc. The PDA may also initiate communications with other devices, as illustrated by the example shown below in FIG. 4.

PDA 22 learns (autonomously and/or by utilizing network and server resources) the user's "geo-routine," i.e., the user's usual location at different times of day and corresponding schedule of travel, for different days of the week. On this basis, the PDA is able to deduce whether the user is following his or her routine and is on time, or whether there have been delays or changes (to which the PDA may respond with suggested plans and solutions). Based on the routine that it has learned, the PDA may prompt the user with suggestions regarding travel plans or may request instructions in this regard. For example, if the user generally travels by train to work, but the PDA learns during the night that the trains will not be operating the next day, the PDA may awaken the user 15 minutes earlier than usual and suggest a bus that the user will be able to catch in order to get to work on time.

The user's routine may also have significance beyond his or her purely geographic intent, extending to other sorts of needs and intents. For example, if a user tends to stop near a supermarket of a certain chain on his way home after work on Thursdays, and to remain there for an average duration of 30 minutes before continuing his journey, the PDA will identify this pattern as a reoccurring event related to buying groceries. If, one Thursday, the user ends his work day with a customer meeting in a different town, PDA 22 may still suggest stopping for groceries on the way home, but it will then identify and propose a different supermarket of the same chain—this time optimized in its location to the route leading the user home.

PDA 22 may deduce the user's current mode of transport based on inputs such as location (GPS), acceleration, audio inputs, and communication signals. Speed of motion can be used to determine whether the user is in a vehicle or on foot, but the PDA may also use other cues to form a more precise picture of the type and circumstances of travel. For example, if the user walked 130 meters from his home to a road junction, was stationary for six minutes, and then commenced motion identified as vehicular, while accelerating and decelerating in accordance with general traffic, it is likely that the user has been picked up by a work colleague or possibly a taxi. On the other hand, if the movement pattern of the vehicle correlates to known locations of bus stops, the user is most likely on a bus or shuttle service. The last known location of the user's own vehicle may also incorporated into the determination process.

Other factors, not directly motion-related, may also be integrated by PDA 22 in determining the user's mode of transport. For example, a known Bluetooth™ connection to a speakerphone can provide an indication that the user is traveling in his or her own car. WiFi connections, on the other hand, can indicate that the user is on public transport. The PDA may also collect and analyze sound samples to determine whether the user is on public or private transport on the basis of background sounds.

Additionally, PDA 22 may use the above determination capabilities to recommend certain means of transport to the user. As an example, if a user who tends to walk distances of up to 2 km is located at a café where his meeting was held—to which he arrived by taxi—and is next required to be at an office building located 1 km away, then the PDA may recommend walking, and accordingly prompt the user to leave and provide directions. In the same set of circumstance described above, however, if the PDA has learned that it is about to start raining heavily in the area (through an on-line weather service, for instance), it will recommend booking a taxi—and will do so for the user upon confirmation (again, through an on-line booking service).

Similarly, for a user who reached the office by bus and needs to attend a meeting in a nearby city at 2:30 PM, PDA 22 may scan the intended travel of other users within his relevant circle (for example, work colleagues at the same location who are "open" to such communications) to check whether anyone is planning to drive to the desired location at around the same time. The PDA identifies another user who needs to be at a neighboring office building at 2:00 PM, recommends, invites, coordinates, communicates and manages a "shared ride" process through the PDAs of both users.

Other means of transport managed and suggested by the system may include ferries, trains, subway trains and other public transport networks.

In the process of identifying the user's geo-intent, PDA 22 can also learn about places where the user is or needs to be, and can cope with ambiguities and lack of information by applying contextual analysis to resolving the location. As an example, assuming the user has a calendar meeting with the location "Joe's," and the user has not provided more information as to where "Joe's" is, the PDA can monitor the user's location at the approximate time of the meeting and then confirm with the user that he has attended the meeting and that "Joe's" is indeed at that location (in this case, the room of an executive called Joe). If one or more of the other participants included in the meeting are at the same location as the user at the time of the meeting, the probability of matching the place to the location increases—and "Joe's" is added to the users' lists of resolved places with the appropriate location.

In more complex cases, the PDA may identify a nearby restaurant named "Joe's Pizza," for example, which creates ambiguity with respect to the previously-resolved room. The PDA may then use situational elements, such as time and participants of the meeting, as well as previous trends and patterns of where and when these participants have met, to better predict which of the two possible interpretations of "Joe's" is the likely location of the meeting. Additionally or alternatively, semantic analysis of the meeting subject and added text (for example "farewell from Dan over pizza" vs. "project status") can increase such likelihood.

Figure 4:
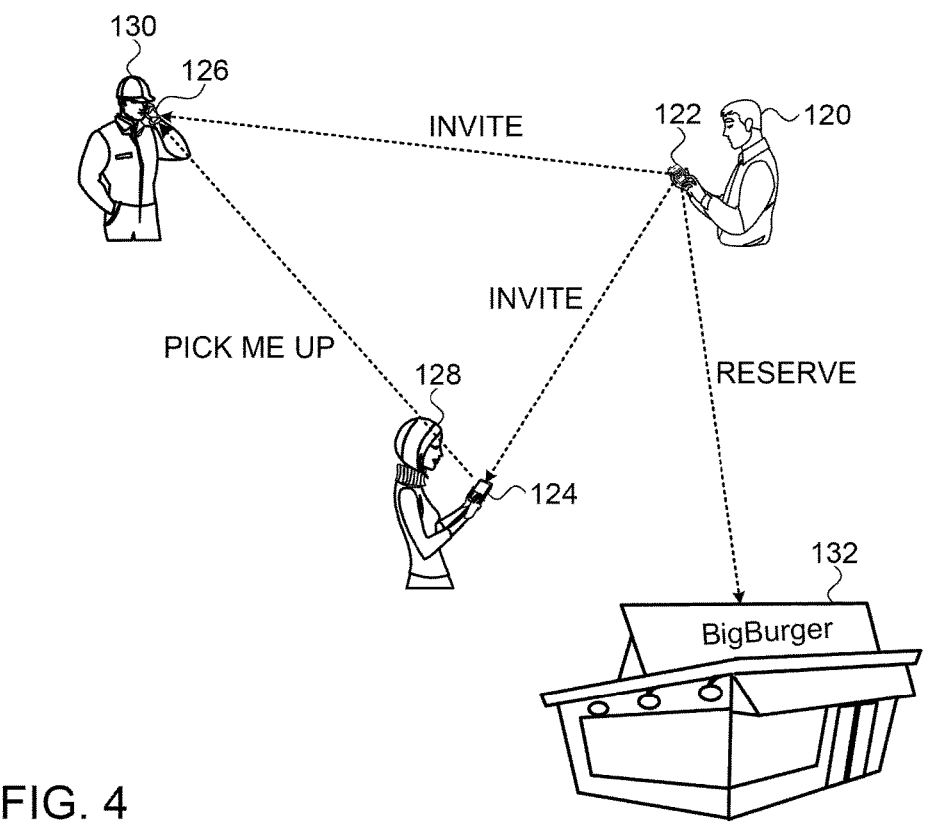
FIG. 4 is a schematic representation of a map illustrating a method for coordination of meeting and travel plans, in accordance with an embodiment of the present invention.

FIG. 4 is a schematic representation of a map showing three users 120, 128, 130 and illustrating communications between their PDAs 122, 124, 126, in accordance with an embodiment of the present invention. This figure will be used as an example of a number of the functions that can be performed by these PDAs in the realm of motion-based personal assistance.

In the pictured example, PDA 122 has learned from the geo-routine of user 120 that the user often frequents diners and often goes out with friends on Friday evening. Based on the friends in the social network of user 120 (as culled by the PDA or by server 40 from the user's social networking application), the PDA locates users 128 and 130 by their respective PDA locations and asks user 120 if he would like to invite them to dinner at a diner 132 in the vicinity. Upon receiving confirmation from user 120, PDA 122 sends an invitation to PDAs 124 and 126 and waits for their answers. PDA 122 also contacts the computerized reservation service of diner 132 to make a reservation for the desired time, say 8 PM.

In preparation for meeting at the diner at the scheduled time, each of the PDAs assesses the means of transport available to its respective user and the amount of time it will take to reach the restaurant from the user's current location. Among the means of transport that a PDA may consider is to request a ride from another participant, based on the locations of the other participants. For this purpose, the PDAs may query one another for location information. In the pictured embodiment, for example, PDA 124 may determine that user 130 will need to make only a small detour in order to collect user 128 on the way to diner 132. PDA 124 therefore sends a "pick me up" request to PDA 126. If user 130 agrees to the request, a notification is sent to PDA 124, and both PDAs take the pick-up time into account in their time planning.

Although this automatic travel coordination function is described here with reference to a simple situation, in which only two users and their respective PDAs are involved, this ride-sharing functionality can be extended to large groups of users. Thus, for example, PDAs can automatically coordinate ride sharing among a group of people who share a common workplace or entertainment destination. The decision to provide a ride when requested is typically left to the operator of the vehicle. When the operator consents, the remaining scheduling arrangements are made automatically by messaging between PDAs.

Returning to the example shown in FIG. 4, based on each user's mode of transport and travel conditions (such as traffic and public transport schedules), the respective PDA computes the time at which the user must leave his or her current location and prompts the user to do so. If the users so desire, their PDAs may exchange location information and inform the other users of their estimated arrival times. For example, PDA 124 may output a message such as "User 130 will arrive at your location in five minutes. You should go downstairs now and wait in front of your building."

The PDAs may also exchange and act on information regarding delays. For example, user 120 may receive a message from PDA 122 stating that "Users 128 and 130 have been caught in a traffic jam. They will arrive at the restaurant at approximately 8:15." PDA 122 may push back the departure time of user 120 accordingly and may automatically notify the diner of the delay, as well.

The above simple scenario has been described for the purpose of illustrating certain motion-based assistance capabilities of PDAs in accordance with an embodiment of the present invention. These capabilities may be implemented in software, based on existing hardware capabilities of smart phones and other devices (such as tablets and other sorts of portable computers). Extensions of these capabilities to other application scenarios will be apparent to those skilled in the art and are considered to be within the scope of the present invention.

Communication with and Among PDAs

PDA 22 enables user 32 to interact graphically with map 30 in order to invoke its scheduling functions and to coordinate these functions with peer devices, such as PDAs 24 and 26. For example, to invite another user to a given event, the user of the PDA may select and drag an icon representing the event on map 30 over to the icon representing the desired user, or vice versa. This sort of graphical gesture may be accompanied by other interactions, such as voice commands or selection of particular text keys on the PDA.

User interface 52 of PDA 22 may also allow the user to input more complex, structured requests by voice or text input. For example, the user may input a request of the form: "I NEED TO BE AT [location] AT/BY [time]." As another example, the user request may be of the form: "I NEED [a specified event to occur] BY [time]."

The user input causes PDA 22 to automatically initiate communications with the appropriate peer device (or devices)—typically another user's PDA. The PDAs exchange queries and responses in order to determine the availability of the respective users and to automatically schedule events. As noted earlier, the queries and responses use a predefined inter-PDA protocol, which may include, for example (and not by way of limitation), the following queries, also referred to as requests:

TABLE II

PDA-TO-PDA PROTOCOL

| Request | Semantics |
|---|---|
| SCHEDULE | Place an entry in the calendar for a specified event |
| INVITE | Place an entry in the calendar for an event to be shared with a specified user/users |
| TELL | Share specified status information with another user |
| WHERE ARE YOU? | Report current location |
| WHEN WILL YOU BE AT . . . | Report estimated time of arrival at specified location |
| MEET ME AT . . . | Place an instruction in the calendar to arrive at a specified location at a specified time |
| PICK ME UP AT . . . | Place an instruction in the calendar to navigate vehicle to a specified location at a specified time and continue to the next destination |
| TAKE MY PLACE AT . . . | Place an entry in the calendar for a specified event in place of the requesting user |
| CHANGE VENUE | Change the location of an event that has already been scheduled |

Each request has a set of permitted responses, and the PDA formulates the response in each case depending on the state of the given user as relevant to the particular request. In some cases the response may be simply a confirmation of the proposed scheduling and location, or a refusal. In other cases (depending on the query semantics), the response may provide requested information or may suggest an alternative time or location for a requested event. The response in each case depends both on the availability of the user in question and on policies maintained by the responding PDA.

As noted earlier, PDA 22 decides how to respond to each request on the basis of policies that the PDA stores and may update from time to time. As long as the response is compliant with policy, the PDA may send the response autonomously, without requiring active involvement by the user. The policies may be set initially by the user and may be updated by the PDA on the basis of user behavior. For example, the user may set as a default policy that entries in his or her calendar should be made available freely to other members of the user's organization. On this basis, the PDA may provide information on the user's availability to a co-worker's PDA and may schedule a work-related meeting with the co-worker.

On the other hand, the user may indicate that certain elements of his or her state should be made available only after user approval, or should be made available differentially to different users. For example, the user may require the PDA, upon receiving a "WHERE ARE YOU?" query, to solicit the user's approval before responding. As another example, the user may allow the PDA to provide any requested state information to the user's spouse, while permitting only certain items to be shared with other family members and friends. When responding to a given request would require the PDA to violate policy, the PDA will simply refuse or may request permission from the user before responding.

In managing the user's schedule, PDA 22 may need to resolve conflicts between events that are scheduled at the same or adjacent times. These conflicts may in some cases be resolved by the PDA autonomously on the basis of policy, for example: "If a requested meeting with X [such as the user's boss] conflicts with an existing commitment, reschedule the existing commitment." More generally, the PDA may assign a "commitment intensity" value to each scheduled event and may resolve conflicts in favor of the more intense commitment. The PDA may compute this intensity value based on one or more of the following factors:

A priority rating set by the user for each event or event type.

Relationship analysis by the PDA, i.e., determining the relationship between the user and other participants based on user input or contextual information. Thus, the user's boss might have a high relationship intensity value, while low-ranking employees would have a low value.

Semantic analysis by the PDA of the names or other data associated with the event. The PDA may distinguish in this manner, for example, between business and recreational activities, and may assign a higher semantic intensity value to one than to the other.

Contextual analysis by the PDA of the event and participants. For example, the PDA may search on-line sources of information with respect to the names of the participants in a given event, and may assign a higher contextual intensity value to events in which a participant has a high Google® rating, many friends in social networks, or is otherwise found to be influential or reputable.

PDA 22 may in some cases (or possibly all cases, depending on user preferences) present proposed scheduling decisions to the user for confirmation. Based on the pattern of confirmation or denial of such proposals, the PDA may update its internal ratings of commitment intensity and other policies. In this manner, the percentage of PDA proposals that the user accepts should increase over time, possibly to the point at which certain scheduling decisions may be made autonomously by the PDA without needing to request user confirmation.

A detailed example of communication and coordinated planning is shown below in FIG. 6.

Methods and Examples of System Operation

FIG. 5 is a flow chart that schematically illustrates a method for constructing a user's state vector, in accordance with an embodiment of the present invention. The steps in the method are numbered serially, although some of the steps may be carried out in a different order from that shown, and additional steps may be added. A list of possible inputs is presented to the right of each step. These input lists are not intended to be exhaustive, however, and other available inputs may also be processed.

PDA 22 obtains user location information, at a location sensing step 140. This information is typically provided by location manager 60, using inputs from positioning sensors 57, such as a GPS or WiFi receiver. The PDA then uses external sources and computational resources to determine the category and type of place where the user is currently located, at a location category determination step 142. Location attributes 144 used at this step could include, for example, map data identifiers (administrative level, urban vs. rural, residential vs. commercial, etc.), road identifiers (highway, street, pedestrian lane, etc.), demographic data regarding the current location (socio-economic, crime rates, etc.), and density of points of interest in a certain category (such as retail or nightlife).

PDA 22 may assess a "geo-cognitive distance" between the user and this location, at a location assessment step 146. The assessment typically takes into account the location category (from step 142), as well as the actual location and the user's geo-routine 148. The geo-cognitive distance measures what the present location "means" to the user, in terms of the level of familiarity and confidence that the user is likely to feel in the location. Factors of significance in this regard may include the distance from the user's home and work areas (for example, same administrative level, other county, other state, other country, or other continent), as well as geo-cultural elements (such as variations in language) and the location categorization. The distance measurement at step 146 can be further extended to identify the user's "role" in relation to the given location, for example, "commuter," "business traveler," "tourist," or "weekend shopper."

An additional factor of significance in the user state is the motion state and means of transport, which PDA 22 evaluates at a motion assessment step 150. This step uses motion related inputs 152, which may come both from sensors 57 and from external sources linked to feed hub 82. PDA 22 may analyze sensor inputs, such as GPS, gyroscope and accelerometer, to determine whether the user is stationary, running, driving, walking, climbing stairs, etc. PDA 22 may also evaluate the user's motion pattern, as explained above to compute the means of transport and situational identifiers of such motion, such as on a bus, in a car, in a taxi, in a traffic jam, etc. The last known location of the user's own vehicle may also be incorporated into the determination process.

PDA 22 attempts to identify where the user intends to be next and when the user is to be there, at a geo-intent determination step 154. The "where" in this step includes not only the coordinates and attributes of the place (as described above with reference to step 142), but also descriptive elements about the corresponding "event," such as category (business meeting, lunch, movie, picking someone up, etc.) and participants. Descriptive elements regarding the participants may include the level of relationship and hierarchy of the participants (for example, a customer, boss, friends, spouse or children). PDA 22 accesses this information via scheduling sources 156, such as the user's calendar and event-management systems (booking services, RSVPs, etc.), as well as information obtained by managing and analyzing the user's daily and weekly commutes and overall travel patterns and motion habits. Temporal intent is often voluntarily provided by the user in the form of a destination entry and/or local search query, such as "pizza," "gas," or "medical center."

PDA 22 accesses additional available information and incorporates this information into the state determination process, at an attribute incorporation step 158. The object of this step is to analyze the effect of various temporal and static elements 160 on the user's cognitive motion state. Elements 160 may include, for example, estimated time of arrival (ETA) to the next destination given the current means of transport and the current traffic situation. PDA 22 compares the ETA to the planned or desired arrival time in order to compute whether the user is ahead of, on or behind schedule, and by how much. This result may be used, in turn, to assess the user's state of mind and most relevant need to be addressed, such as an alternative route to be at the destination sooner, or a coffee shop to enjoy extra time prior to the meeting. Other temporal elements 160 may include, for instance, current and forecasted weather, day of week, time of day, special occasions or events, and people known to the user who are in the area. The PDA may also use information regarding the user's routine in a comparative verification, which checks whether the user is acting within the bounds of his habits and schedules or is, alternatively, experiencing a (desired or undesired) exception from such bounds.

PDA 22 completes its update of the user's state vector and applies it in making decisions and recommendations that go into map 30, as described above, at a map construction step 162.

Table III below presents a number of use cases, illustrating how PDA 22 computes the user's state according to the steps of FIG. 5:

TABLE III

STATE COMPUTATION USE CASES

| | | Textual Representation of Computed State | |
|---|---|---|---|
| Step# | Use Case 1 | Use Case 2 | Use Case 3 |
| 140 | | | |
| 142 | Eran is on hwy no. 2 near Herzliya. | Dan is in Oxford St., London. | Ronen is at work. |
| 146 | Eran is (a commuter) on hwy no. 2 near Herzliya. | Dan is a business traveler in Oxford St., London | |
| 150 | Eran is (a commuter) in a taxi stuck in a traffic jam on hway no. 2 near Herzliya. | Dan is a business traveler walking on Oxford St., London | Ronen is at work and stationary. |
| 154 | Eran is (a commuter) in a taxi stuck in a traffic jam on hway no. 2 near Herzliya, on his way to a 2 PM job interview. | Dan is a business traveler walking on Oxford St., London, and is planning to meet a local friend for dinner at "Wagamama" at 8 PM. | Ronen is at work, stationary, and needs to be home by 7 PM. |
| 158 | Eran is (a commuter) in a taxi stuck in a traffic jam on hway no. 2 near Herzliya, on his way to a 2 PM job interview. He is going to be approx. 17 minutes late. | Dan is a business traveler walking on Oxford St., London, in perfect weather, and is planning to meet a local friend for dinner at "Wagamama" at 8 PM. | Ronen is at work, stationary, and needs to be home by 7 PM. Will need gas on his way there. |

Figure 6A:
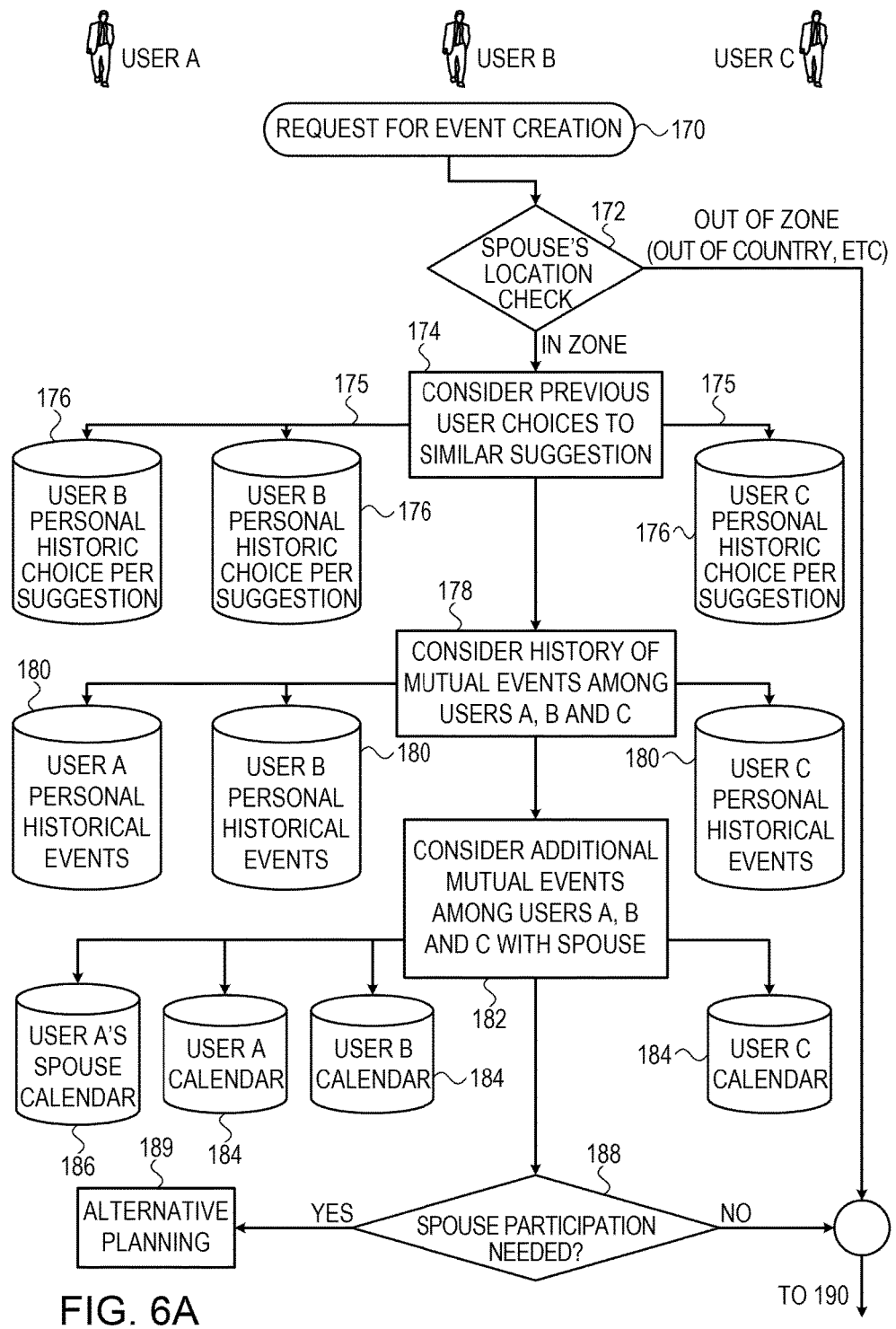
FIGS. 6A-6C are a flow chart that schematically illustrates a method for coordinating a meeting, in accordance with an embodiment of the present invention.
Figure 6B:
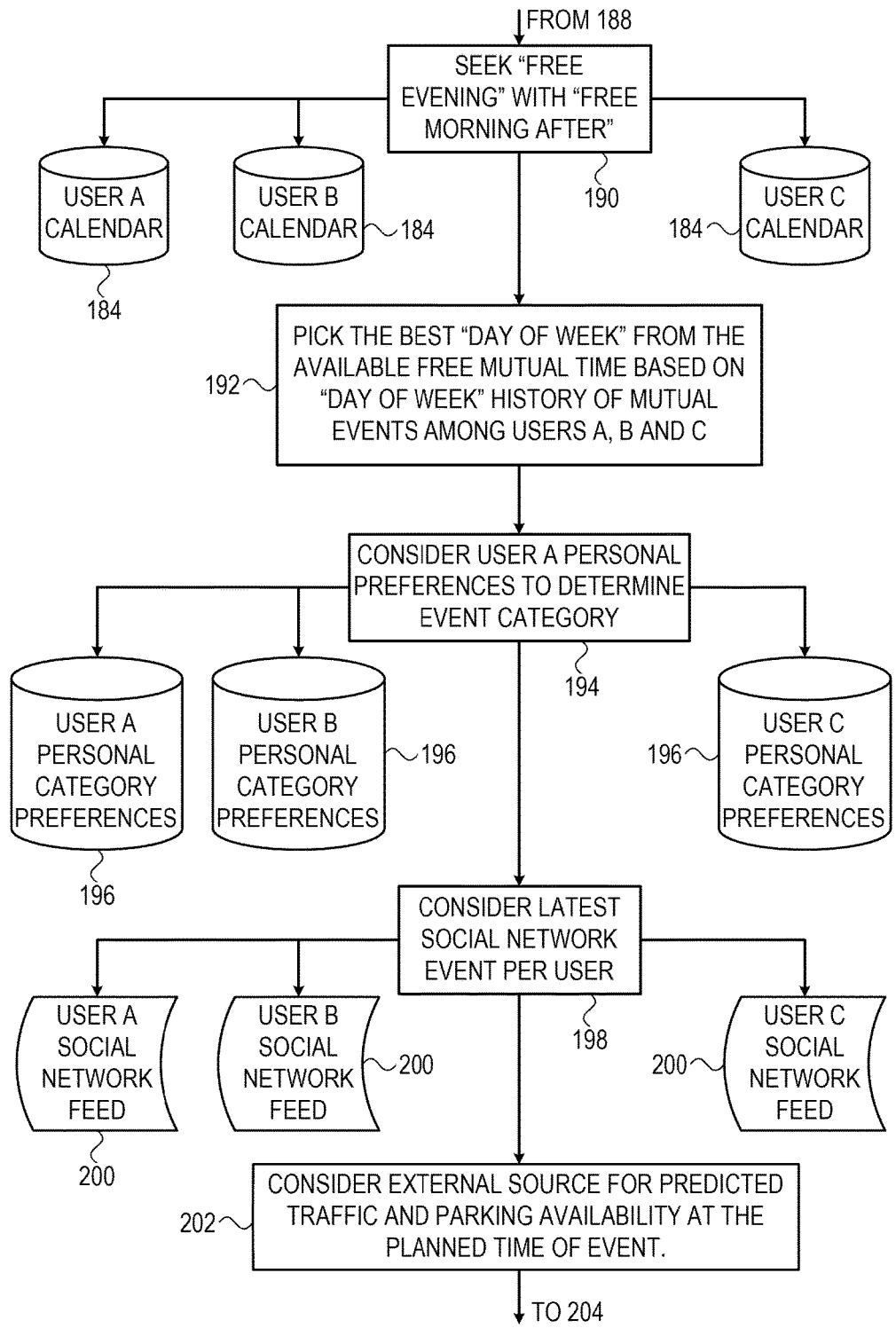
Figure 6C:
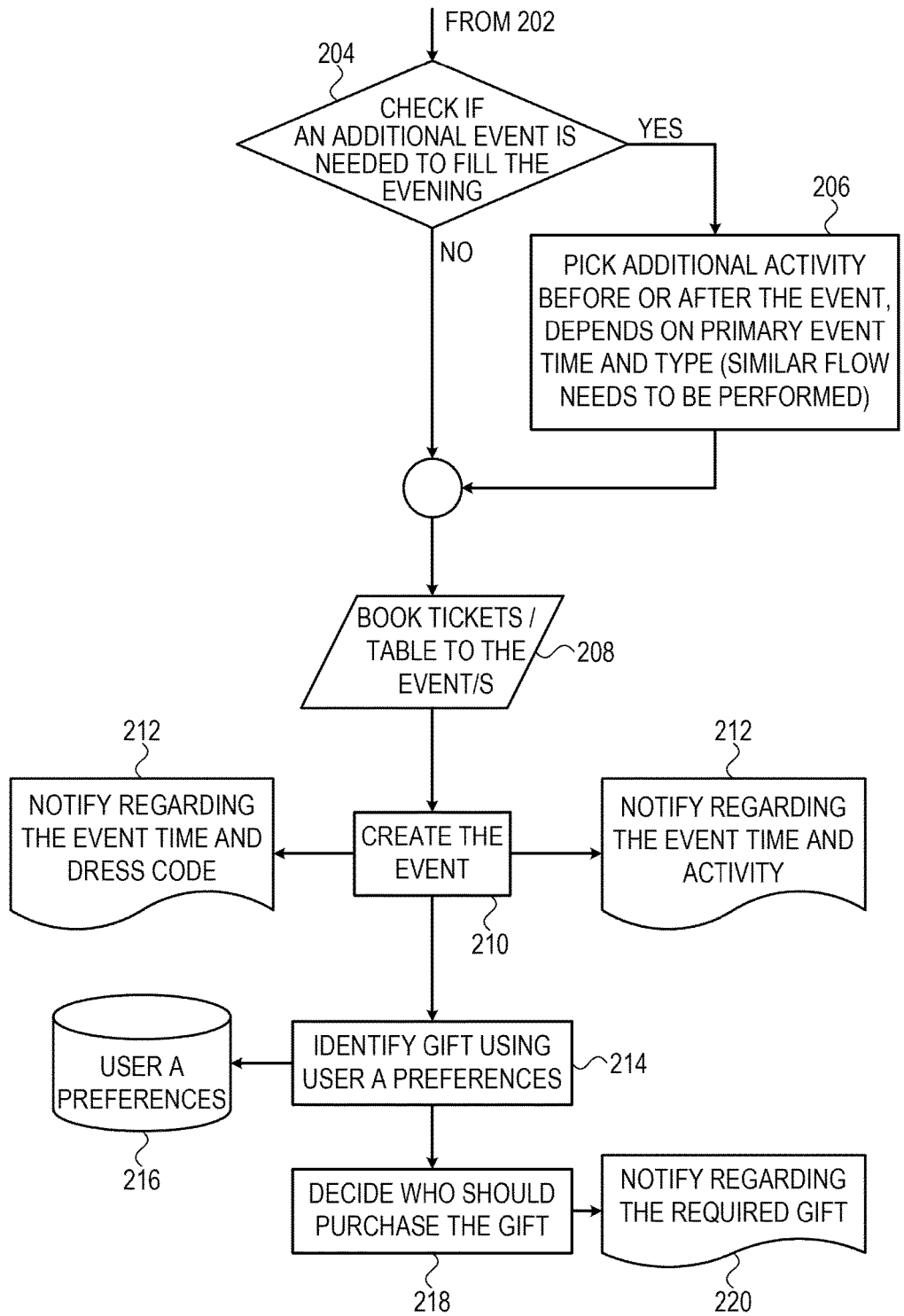

FIGS. 6A-6C are a flow chart that schematically illustrates an example of communication and decision-making processes by and among PDAs, in accordance with an embodiment of the present invention. The PDAs in this case belong to three users, labeled A, B and C at the top of FIG.

6A. As shown in the pictured scenario, the PDA of User B, who initiates the event in question, considers previous choices and events in which the user has been involved. The steps shown in FIGS. 6A-6C illustrate how the PDA learns and improves the service that it provides over time. By analyzing previous rules, the PDA is in a position to determine the optimal rules and questions to ask in any given situation and to sharpen the relevance of the questions over time. Various learning algorithms that are known in the art may be applied for this purpose.

User B submits a request to his PDA to set up a social event together with Users A and C, at an event request step 170. User B does not specify whether or not spouses are to be involved. The PDA of User B (referred to hereinbelow as PDA-B) determines that the schedule and preferences of User A are to be given priority in scheduling the event. This priority may be indicated explicitly by User B, or it may be inferred by PDA-B based on the known relationship between the users.

PDA-B first goes through a number of steps to determine whether or not spouses should be invited. PDA-B may first check whether the spouse of User B is available, at a spouse location step 172. If not, the PDA assumes spouses will not be involved. If involvement of spouses is a possibility, PDA-B checks whether or not Users A, B and C tend to choose to invite spouses to meetings of this sort. For this purpose, PDA-B may check its records of personal choices 176 made by User B in response to suggested spouse involvement and its records of past events 180, to determine how often and under what circumstances spouses have been involved. PDA-B also checks the corresponding records with respect to Users A and C by communicating autonomously with PDA-A and PDA-C. These autonomous PDA-to-PDA communications are indicated by horizontal arrows 175 in FIGS. 6A-6C. On this basis, PDA-B may consider the choices and history of mutual events among users A, B and C at a choice collation step 174 and a history collation step 178.

In addition, PDA-B may check whether a joint event to be shared by the users with their spouses has been or could be scheduled, at a spouse event checking step 182. At this step, PDA-B communicates not only with PDA-A and PDA-C to check their respective calendars 184, but may also check the spouses' calendars, particularly a calendar 186 of the spouse of User A.

Based on the above inputs, PDA-B evaluates whether participation of spouses is required in the event requested by User B, at a spouse evaluation step 188. If an existing event with spouse participation was already discovered at step 182, or the user choices and history considered at steps 174 and 178 indicate that involvement of spouses is not desired, PDA-B goes on to plan a joint event for Users A, B and C only, as described below. Otherwise, PDA-B initiates an alternative planning process 189, including spouses, but this process is omitted from the present description for the sake of simplicity.

PDA-B checks calendars 184, by communication with PDA-A and PDA-C, in order to find a suitable date and time for the joint event, at a time seeking step 190. In the present example, PDA-B may seek not only an evening on which all of the users are free, but may look for an evening with a free "morning after" so that the users can enjoy their evening without pressure. When the users have a number of different days on which they are available, PDA-B may choose the day for the present event based on the history of past events, which may indicate that this group of users has shown a preference to meet on a certain day of the week, at a date selection step 192.

After choosing the date, PDA-B goes on to choose a place for the event based on various considerations, again giving priority to User A. PDA-B considers the preferences of the users as to the type of event, at a category selection step 194, by reviewing personal preferences 196 stored by the users' respective PDAs. These preferences may be based both on policies set explicitly by the users and by analysis by the PDAs of past user behavior. PDA-B may also access, via server 40, social network feeds 200 of Users A, B and C in order to check user posts indicating the sorts of events in which they have recently participated, in a social network checking step 198. In addition, PDA-B may check traffic and parking information in order to ensure that the event of interest will not be too difficult to get to, at a transportation checking step 202. For this purpose, for example, the PDA may consult information feeds regarding incidents and special events in the area of interest. Given all of the above inputs, PDA-B chooses an event and may present the event to User B for approval.

PDA-B may also evaluate the duration of the chosen event in order to determine whether it will fill the amount of time that the users prefer to spend together, at a duration checking step 204. If not, PDA-B may seek an additional activity, either before or after the scheduled event, at an additional event selection step 206. The choice depends on the timing and type of the event that has been scheduled.

Having chosen the event (or events), PDA-B communicates with the appropriate Web sites or services to make the necessary arrangements, such as booking tickets or a table in a restaurant, at a reservation step 208. PDA-B then creates an event in its own calendar, at an event creation step 210, and passes notifications 212 to PDA-A and PDA-C. These notifications may include ancillary information, such as dress code.

If appropriate, PDA-B may identify an appropriate gift to bring to the event for User A, at a gift identification step 214. User B may prompt the PDA for a gift suggestion, or PDA-B may raise the suggestion autonomously based, for example, on past behavior in similar circumstances. PDA-B may query PDA-A for information regarding preferences 216 of User A in this regard. PDA-B may then decide who should actually purchase the gift, at a buyer selection step 218. If the state of User B, as computed by PDA-B, indicates that User B will not have the time or inclination to buy the gift, PDA-B sends a notification 220 to PDA-C of the required gift that User C should buy.

The example presented above is for illustrative purposes only and should not be considered in any way to limit the scope of the present invention. Even in this specific scenario, additional rules and constraints may apply but are omitted for the sake of simplicity.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. An apparatus comprising:
   a memory configured to hold a data structure that is indicative of a state of a user of the apparatus, wherein the state of the user is at least partially based on a geo-cognitive distance measuring a level of familiarity of the user with a present location of the user;
a user interface comprising a display; and
a processor configured to:
  maintain the data structure;
  responsive to the state, generate a map indicating targets within an area of relevance surrounding the present location of the user;
  provide, based on the map, via the user interface, a suggestion to the user of an action to be taken by the user with respect to one or more of the targets;
  detect the present location of the user, and to categorize the detected location;
  assess, responsive to a category of the detected location, the geo-cognitive distance between the user and the detected location;
  automatically detect a state of motion of the user;
  identify an intended destination of the user and an estimated time of arrival at the intended destination; and
  suggest, responsive to the state of motion and the estimated time of arrival, a diversion to one of the targets en route to the intended destination.

2. An apparatus comprising:
a memory configured to hold a data structure that is indicative of a state of a user of the apparatus, wherein the state of the user is at least partially based on a geo-cognitive distance measuring a level of familiarity of the user with a present location of the user;
a user interface comprising a display; and
a processor configured to:
  maintain the data structure;
  responsive to the state, generate a map indicating targets within an area of relevance surrounding the present location of the user;
  provide, based on the map, via the user interface, a suggestion to the user of an action to be taken by the user with respect to one or more of the targets;
  automatically learn a temporal routine of the user, and to evaluate the state of the user with respect to the routine;
  analyze a behavior of the user relative to the temporal routine in order to assess a state of mind of the user, and to choose the suggestion to be provided responsive to the state of mind;
  analyze user responses to suggestions provided via the user interface in order to derive user preferences; and
  apply the user preferences together with the state of the user in generation of the suggestion.

3. The apparatus according to claim 2, wherein at least one of the targets comprises a person having a mobile device, and wherein the apparatus comprises a communication interface, and wherein the processor is configured to carry out an autonomous communication with the mobile device via the communication interface in order to coordinate the action with the person.

4. An apparatus comprising:
a memory;
a user interface;
one or more sensors; and
a processor to:
  collect inputs from the one or more sensors with respect to motion of a user of the apparatus;
  determine a motion-related state of the user based on the inputs and a geo-cognitive distance measuring a level of familiarity of the user with a present location of the user; and
  provide, based on the motion-related state, via the user interface to the user a suggestion of an action to be taken by the user,
  wherein the motion-related state comprises an identification of a means of transport by which the user is traveling, including whether the user is traveling in a private vehicle or on public transport, and
  wherein the suggestion comprises a recommendation to the user of an alternative means of transport.

5. The apparatus according to claim 4, wherein the motion-related state comprises an identification of an intended destination of the user and an estimated time of arrival at the intended destination, and wherein the processor is configured to suggest to the user, responsive to the state and the estimated time of arrival, a stop en route to the intended destination.

6. The apparatus according to claim 5, wherein the apparatus comprises a communication interface, and wherein the processor is configured to carry out an autonomous communication via the communication interface with a mobile device of a person that the user is to meet, and to coordinate travel between the user and the person.

7. The apparatus according to claim 4, wherein the processor is configured to receive from the user, via the user interface, a name associated with a place to which the user is planning to travel, and to resolve a location of the place to be associated with the name responsive to the motion of the user.

8. The apparatus according to claim 4, wherein the processor is configured to receive from the user, via the user interface, an indication of an event to be scheduled, in which a second user is to participate, and responsive to the indication, to autonomously transmit a request via a communication interface of the apparatus to a personal digital assistant (PDA) operated by the second user in accordance with a predefined inter-PDA protocol, and upon receipt of a response from the PDA, in accordance with the predefined inter-PDA protocol, to automatically enter the event in a schedule of the user maintained in the memory.

9. The apparatus according to claim 8, wherein the processor is configured to apply a predefined policy so as to decide whether to confirm or decline participation in the event, resolve, based on the policy, a time conflict between the event and another event in which the participation of the first user is requested, including computation of a respective commitment intensity of the user to each of the events, and autonomously choose the event in which to participate responsive to the commitment intensity.

10. At least one non-transitory computer-readable medium in which program instructions are stored, which instructions, when read by a portable computer, cause the portable computer to:
  collect inputs from the one or more sensors with respect to motion of a user of the portable computer;
  determine a motion-related state of the user based on the inputs and a geo-cognitive distance measuring a level of familiarity of the user with a present location of the user; and
  provide, based on the motion-related state, via a user interface to the user a suggestion of an action to be taken by the user,
  wherein the motion-related state comprises an identification of a means of transport by which the user is traveling, including whether the user is traveling in a private vehicle or on public transport, and
wherein the suggestion comprises a recommendation to the user of an alternative means of transport.

* * * * *